United States Patent [19]

Eckhoff et al.

[11] Patent Number: 6,011,555

[45] Date of Patent: Jan. 4, 2000

[54] METHOD AND APPARATUS FOR A DROP DOWN CONTROL THAT CHANGES CONTENTS DYNAMICALLY

[75] Inventors: Randy Peter Eckhoff, Apex; Carol Ann Jones, Raleigh, both of N.C.

[73] Assignee: International Business Machine Corp., Armonk, N.Y.

[21] Appl. No.: 08/627,856

[22] Filed: Apr. 3, 1996

[51] Int. Cl.[7] .................................................. G06E 3/14
[52] U.S. Cl. .......................................... 345/353; 345/352
[58] Field of Search ...................... 395/353, 352, 395/354, 356, 340, 339, 347; 345/353, 352, 340, 339, 347, 346, 354, 356, 326

[56] References Cited

U.S. PATENT DOCUMENTS

| | | | |
|---|---|---|---|
| 4,862,390 | 8/1989 | Weiner | 345/352 |
| 5,204,947 | 4/1993 | Bernstein et al. | 395/357 |
| 5,261,042 | 11/1993 | Brandt | 395/352 |
| 5,263,174 | 11/1993 | Cayman | 395/800 |
| 5,500,936 | 3/1996 | Allen et al. | 345/353 |
| 5,530,796 | 6/1996 | Wang | 395/352 |
| 5,615,346 | 3/1997 | Gerken | 345/341 |
| 5,625,783 | 4/1997 | Ezekiel et al. | 395/352 |

*Primary Examiner*—Raymond J. Bayerl
*Assistant Examiner*—Steve Sax
*Attorney, Agent, or Firm*—A. Bruce Clay

[57] ABSTRACT

A dynamic drop down control divides a drop down list into a plurality of sections. At least a first section has categories listed therein and at least a second section has items specific to a selected category listed therein. As the selected category is changed, so is the specific items listed in the second section.

9 Claims, 8 Drawing Sheets

TOY STORE INVENTORY — 70

| I. DOLLS | AMOUNT | LOCATION |
|---|---|---|
| A. WALKING | 10 | AISLE 3 |
| B. TALKING | 5 | AISLE 4 |
| C. CRYING | 7 | 2ND FLOOR |
| II. TRUCKS | | |
| A. FIRE | 20 | AISLE 2 |
| B. DUMP | 5 | AISLE 4 |
| C. PICKUP | 15 | AISLE 5 |
| III. GAMES | | |
| A. CARDS | 2 | AISLE 1 |
| B. BOARD | 35 | AISLE 2 |
| C. DICE | 6 | AISLE 4 |

METHOD AND APPARATUS FOR A DROP DOWN CONTROL THAT CHANGES CONTENTS DYNAMICALLY

TECHNICAL FIELD OF THE INVENTION

This invention relates in general to data processing systems, and in particular to a method and apparatus for a drop down list selection control that changes its contents dynamically for selecting an item from a category of choices.

BACKGROUND OF THE INVENTION

Software applications that provide interactive displays are commonly known and widely used in business environments. A frequently used technique for the business application is a drop down control. The control often provides clues and/or required choices for entry into a specified field.

In Windows and OS/2 operating system applications, drop down controls are activated by selecting an arrow in the right hand corner. A drop down list is then displayed for user selection. The selection is made by clicking on the appropriate choice. As soon as the choice is made, the list is hidden and the choice is displayed in the text box. The list may have scroll bars if there are too many items for display in a single view.

The MacIntosh operating system uses a similar technique called PopUp buttons. By pressing and holding the mouse button, a list is displayed. As long as the mouse button is depressed, the list remains visible. By scrolling the mouse pointer down the list, the user can make a selection. Once the proper choice is highlighted, the mouse button is released and the selection is made.

Regardless of whichever technique is used, if the list of choices becomes too long, the practicality of the drop down list is reduced. In fact, at some point it may become necessary to create additional drop down controls to hold the extra choices. Thus, there is a need for a method and apparatus which allows a category of choices in a drop down control in order to save valuable screen space and user time.

SUMMARY OF THE INVENTION

The present invention disclosed herein comprises a method and apparatus for a drop down control that substantially eliminates problems associated with prior drop down controls. The present invention allows the categorization of drop down list items by reducing the amount of space required for lengthy lists.

In accordance with one aspect of the invention, a method is provided for dynamically selecting from a drop down control on a data processing system. A text box is activated with an activation mechanism. A drop down list is displayed upon selection of the activation mechanism. A plurality of selectable categories is then displayed in a first section of the drop down list. In addition, at least one specific selectable item is displayed in a second section of the drop down list, the specific selectable item being related to a category selected in the first section.

It is a technical advantage of the present invention that a drop down list may be categorized in order to save display space and simplify the locating of any specific item therein.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION OF THE INVENTION

Figure 1:
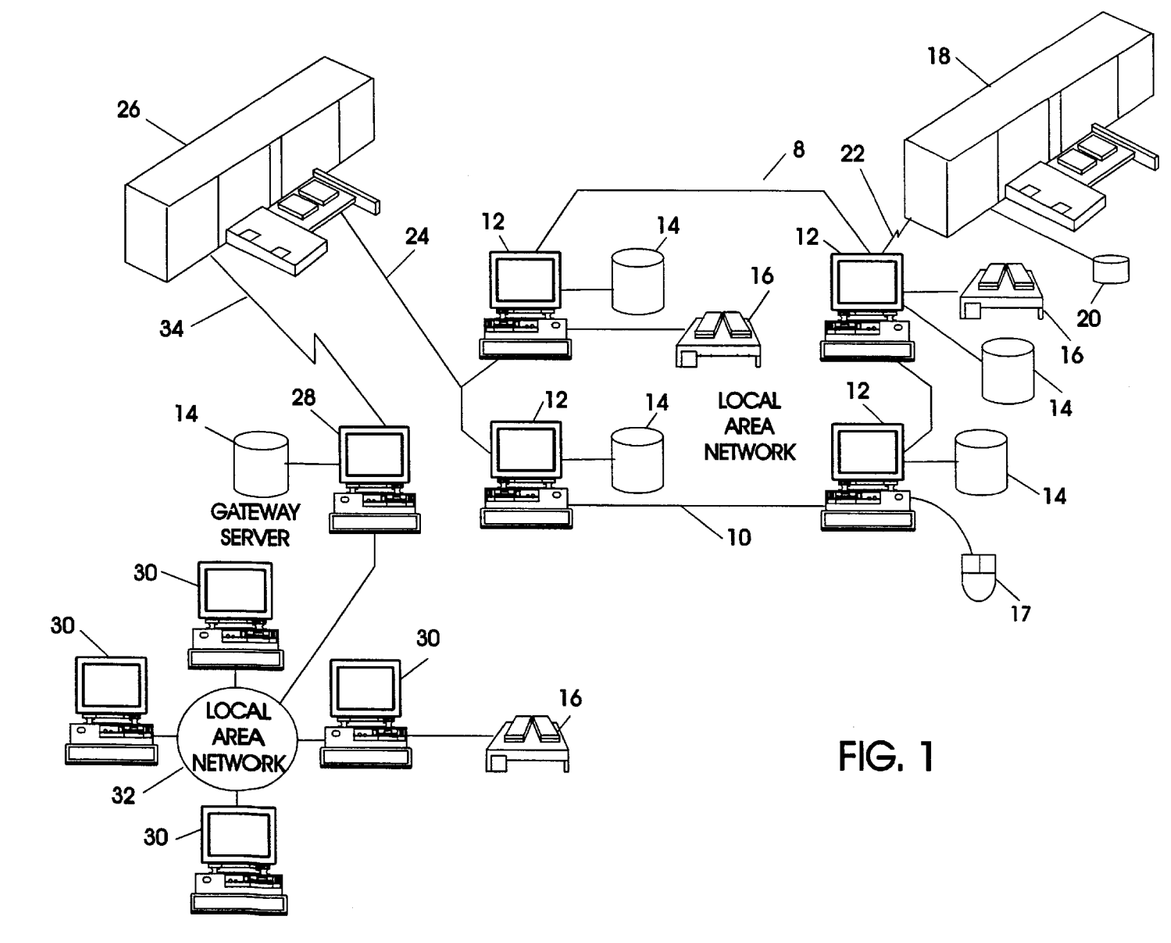
FIG. 1 is a schematic illustration of a data processing system in which the present invention may be utilized.

Referring to FIG. 1, there is depicted a graphical representation of a data processing system 8, which may be utilized to implement the present invention. As may be seen, data processing system 8 may include a plurality of networks, such as local area networks (LAN) 10 and 32, each of which preferably includes a plurality of individual computers 12 and 30, respectively. Of course, those skilled in the art will appreciate that a plurality of intelligent workstations (IWS) coupled to a host processor may be utilized for each such network. As is common in such data processing systems, each individual computer may be coupled to a storage device 14 and/or a printer/output device 16. In addition, each computer may be provided with a pointing device such as mouse 17.

The data processing system 8 may also include multiple mainframe computers, such as mainframe computer 18 which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. The gateway server 28 is preferably an individual computer or IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California, while LAN 10 may be located within North Carolina, and mainframe computer 18 may be located in New York.

Software program code which employs the present invention is typically stored in memory, such as the storage device 14, from which a developer may access the code. For distribution purposes, the software program code may be embodied on any of a variety of known media for use with a data processing system, such as a diskette or CD-ROM, or may be distributed over a network of some type to other computer systems for use by users of such other systems. Such techniques and methods for embodying software code on media and/or distributing software code are well known and will not be further discussed herein.

Figure 2A:
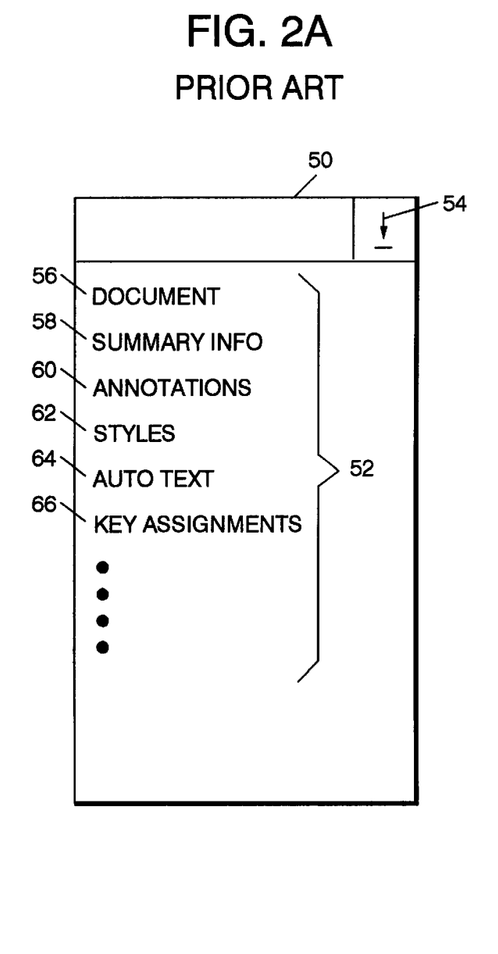
FIGS. 2A and 2B depict a list box in accordance with the prior art.

FIGS. 2A and 2B illustrate the use of a typical prior art text box 50 with a corresponding drop down list 52. By clicking on the arrow 54 in the text box 50, the drop down list 52, which is normally not visible, appears (FIG. 2A). The drop down list 52 contains a plurality of selectable items such as, for example, DOCUMENT 56, SUMMARY INFO 58, ANNOTATIONS 60, STYLES 62, AUTO TEXT 64, KEY ASSIGNMENTS 66, and etc.

Figure 2B:
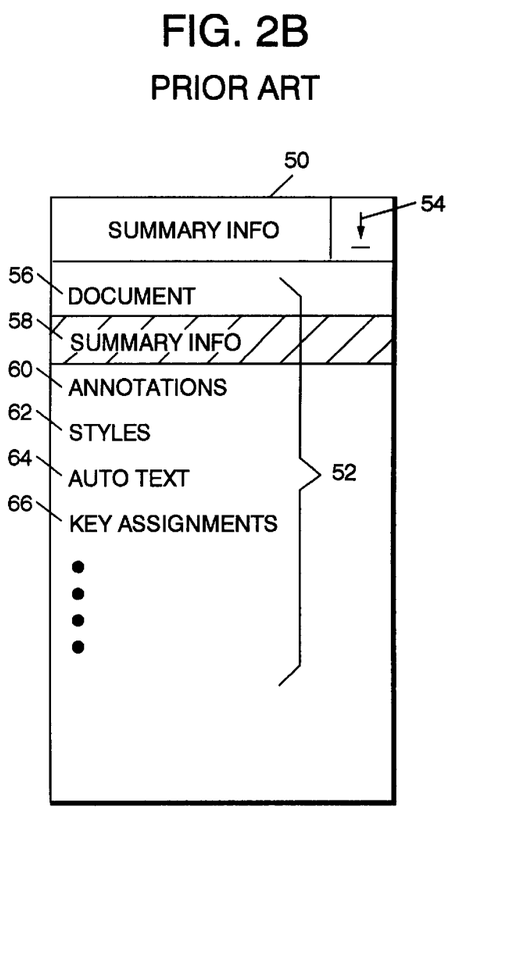

Referring next to FIG. 2B, SUMMARY INFO 58 has been selected by clicking thereon with a mouse. SUMMARY INFO 58 is now highlighted and also appears in the text box 50. As is typical in the prior art, the drop down list 52 will disappear as soon as a selection has been made. If there are too many selectable items for viewing within the visible area of the list 52, scroll bars will be provided. However, if the list is too long, it becomes a chore to use and search through.

Figure 3:
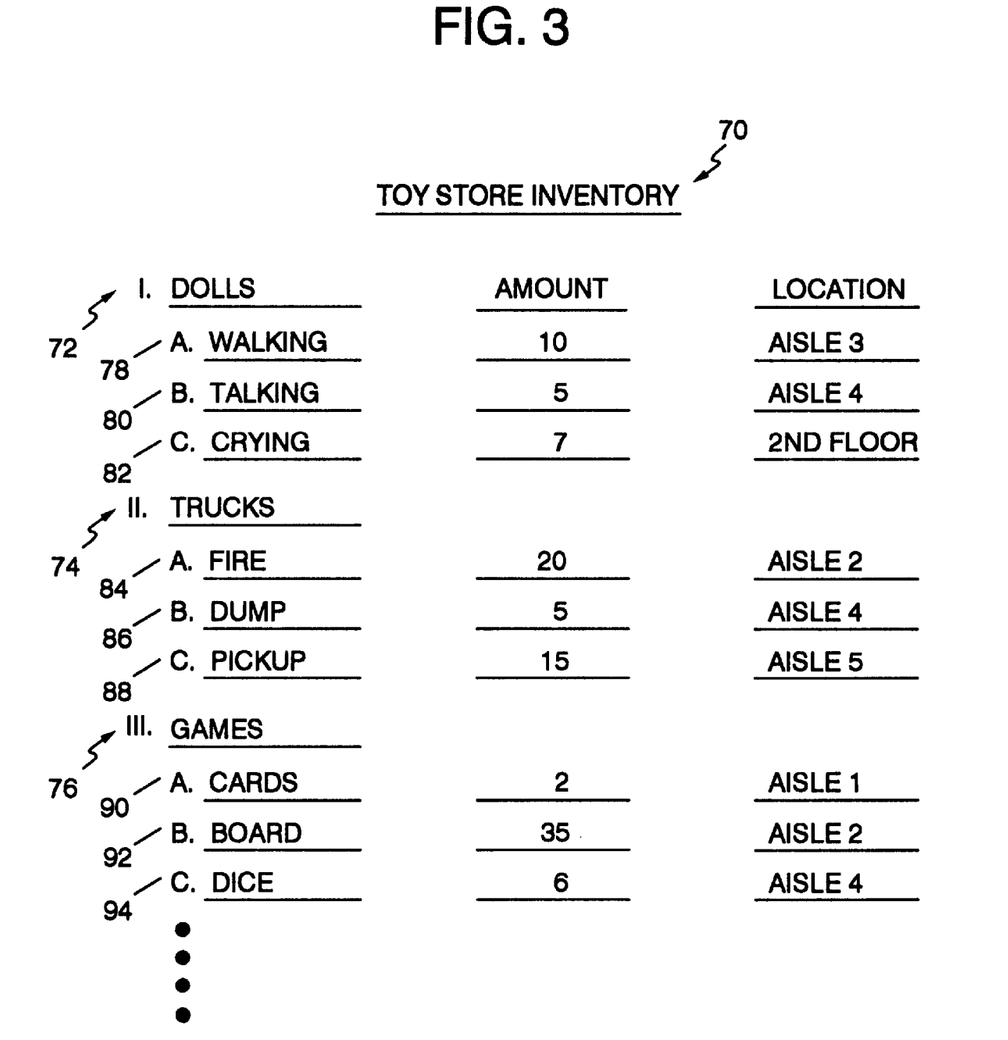
FIG. 3 illustrates an example for which the present invention may be implemented.

Referring to FIGS. 3–7, one embodiment illustrating the present invention is shown. Referring first to FIG. 3, a partial inventory for a toy store is shown, as generally indicated by reference numeral 70. The inventory is comprised of a plurality of categories such as, for example, DOLLS 72, TRUCKS 74 and GAMES 76. Each category in turn has a plurality of inventory items such as, for example, WALKING 78, TALKING 80, CRYING 82 (types of dolls); FIRE 84, DUMP 86, PICKUP 88 (types of tucks); and CARDS 90, BOARD 92, DICE 94 (types of games). Of course, it is to be understood that there would be many other items in inventory as well as other categories and/or subcategories which are contemplated by the present invention.

Figure 4:
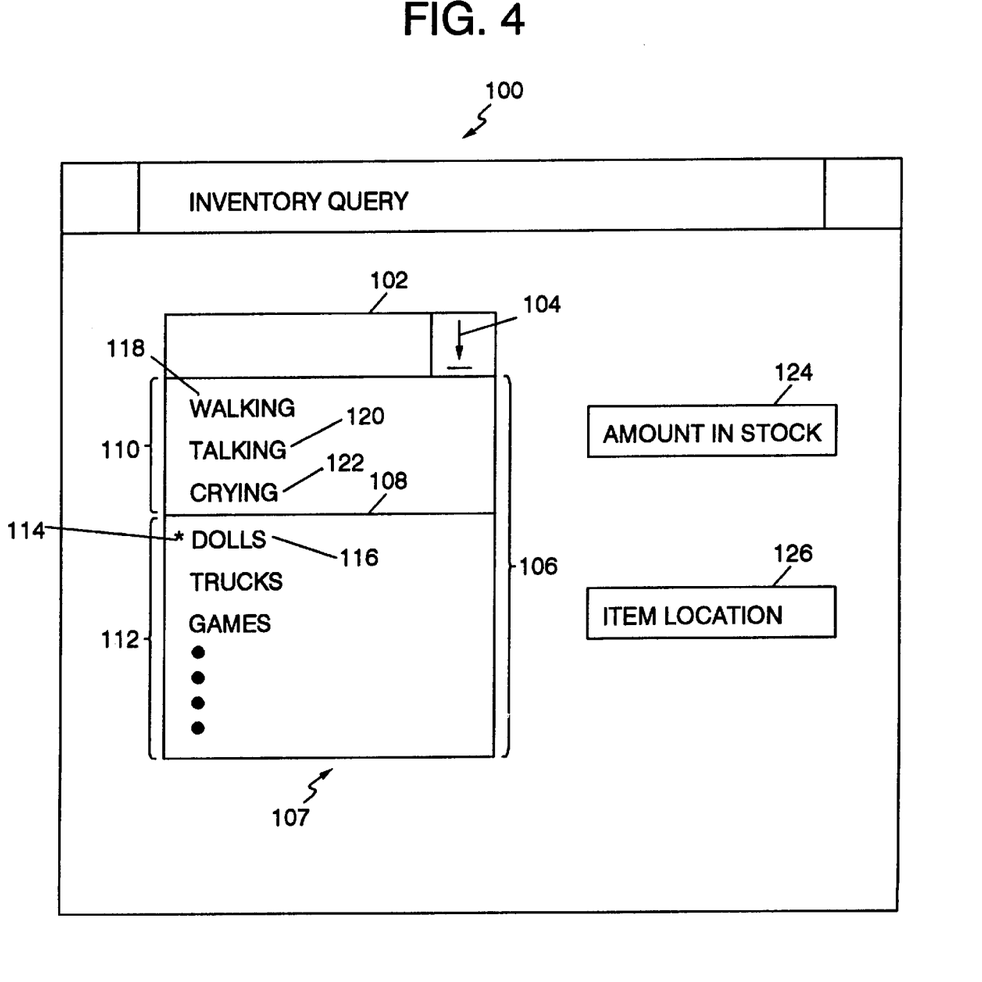
FIGS. 4–7 illustrate an embodiment of the present invention using the example of FIG. 3.

In FIG. 4, a screen 100 illustrates use of the present invention with the toy store partial inventory of FIG. 3. A text box 102 is activated by clicking on arrow 104 therein with a mouse. Once activated, a drop down list 106 (normally not visible) appears, resulting in a drop down control, generally identified by the reference numeral 107. Unlike the prior art, the list 106 has a dividing line 108 separating it into a specific item of inventory section 110 and a category section 112. An asterisk 114 appears next to a category DOLLS 116. The asterisk 114 is used to mark the category for which the specific items of inventory appear in the section 110. Thus in the example shown, the category DOLLS 116 has specific items of inventory WALKING 118, TALKING 120 and CRYING 122. Also shown in the screen 100 are boxes labeled AMOUNT IN STOCK 124 and ITEM LOCATION 126 for the presentation of desired information, as will be more fully described below.

Figure 5:
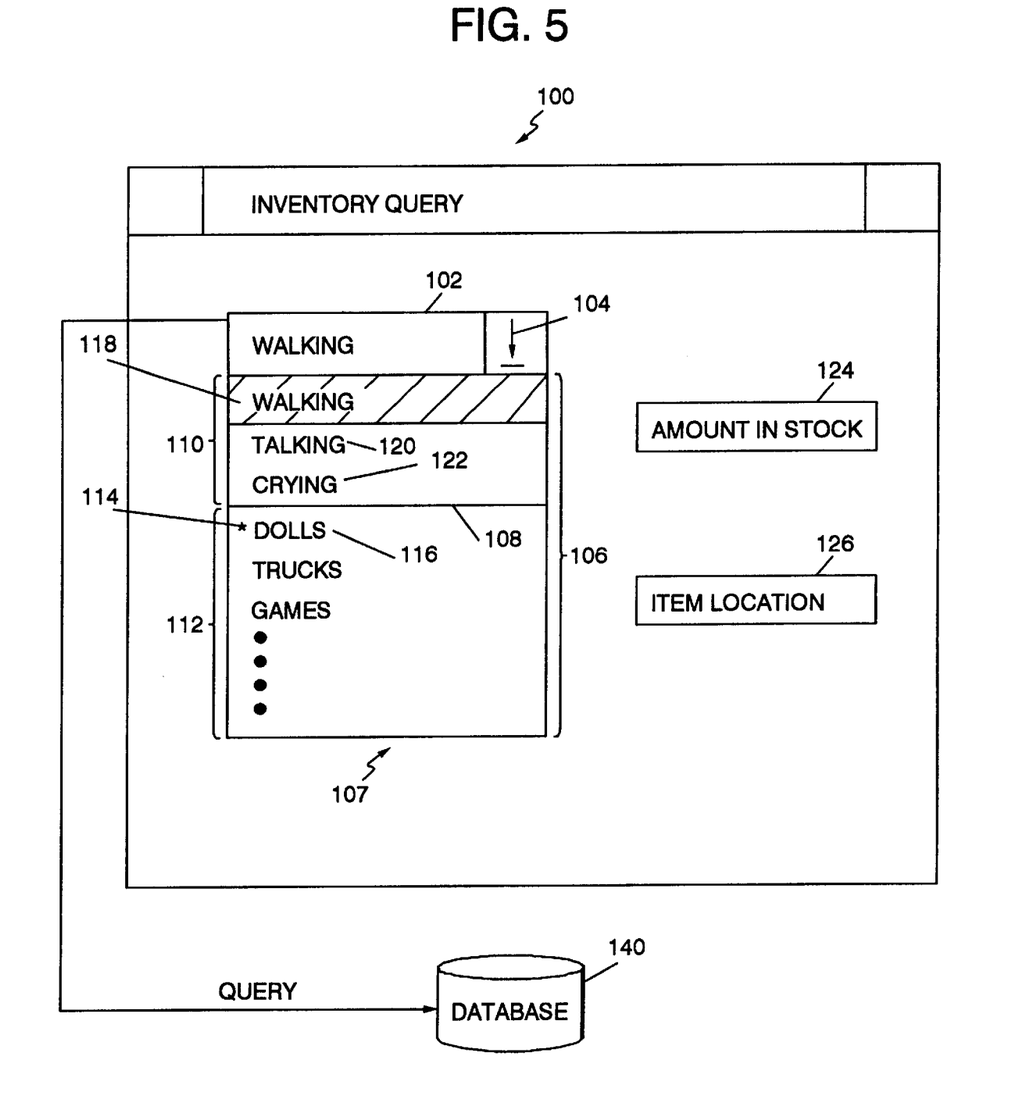

In FIG. 5, a store clerk (not shown) has selected a specific item of inventory, WALKING 118 from the category DOLLS 116, as the result of a customer inquiry as to whether there are any walking dolls in inventory and where they are located. Upon selecting WALKING 118 with a mouse, it is highlighted and also appears within the text box 102. Simultaneously, a database query is initiated and database 140 is searched for walking dolls.

Figure 6:
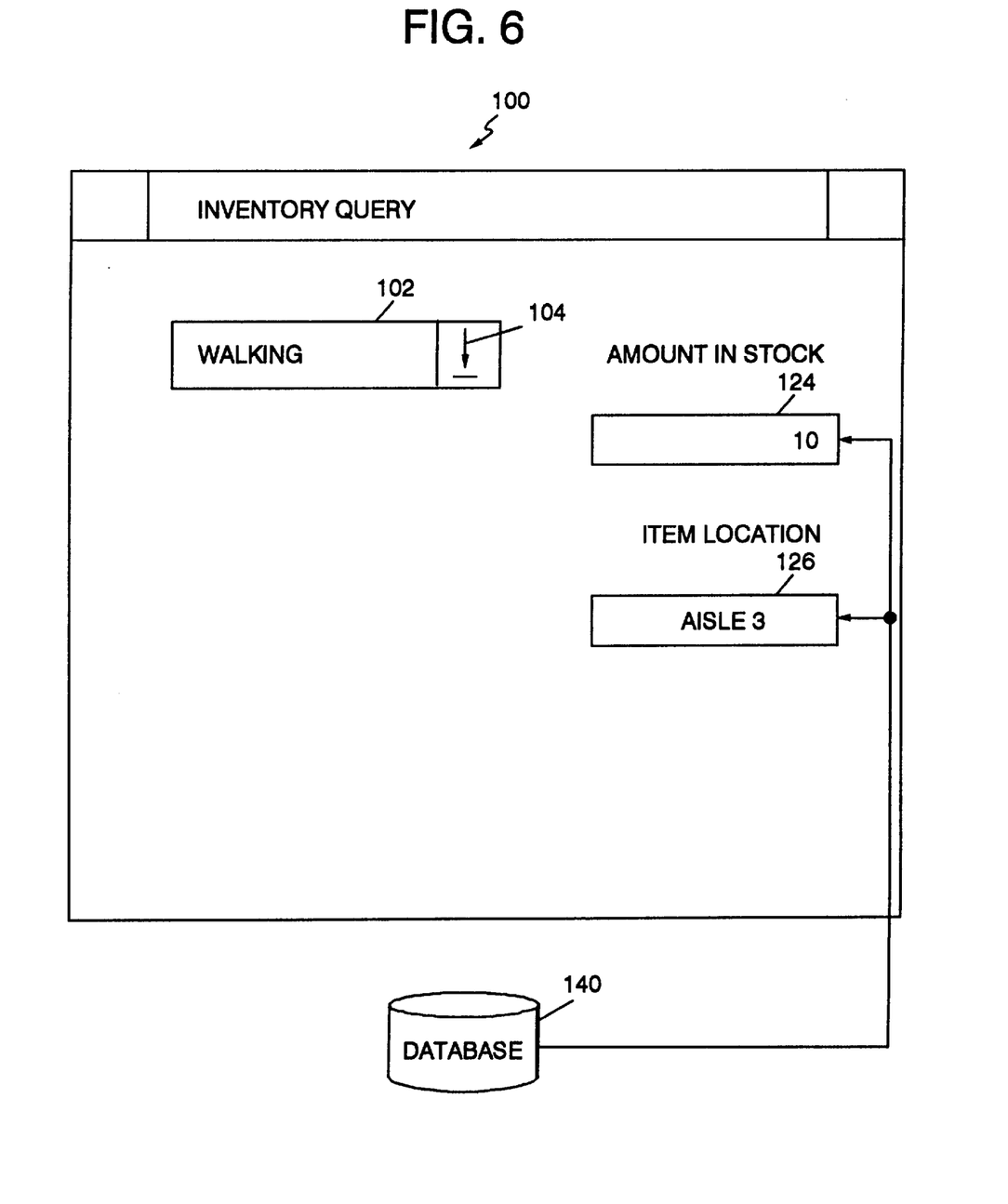

Referring next to FIG. 6, as is typical with list boxes, once a selection of a specific item has been made, the drop down list disappears from the screen. As a result of the database query, it has been found that there are ten walking dolls in stock and they are located in aisle 3 (shown in box 124 and 126, respectively).

Figure 7:
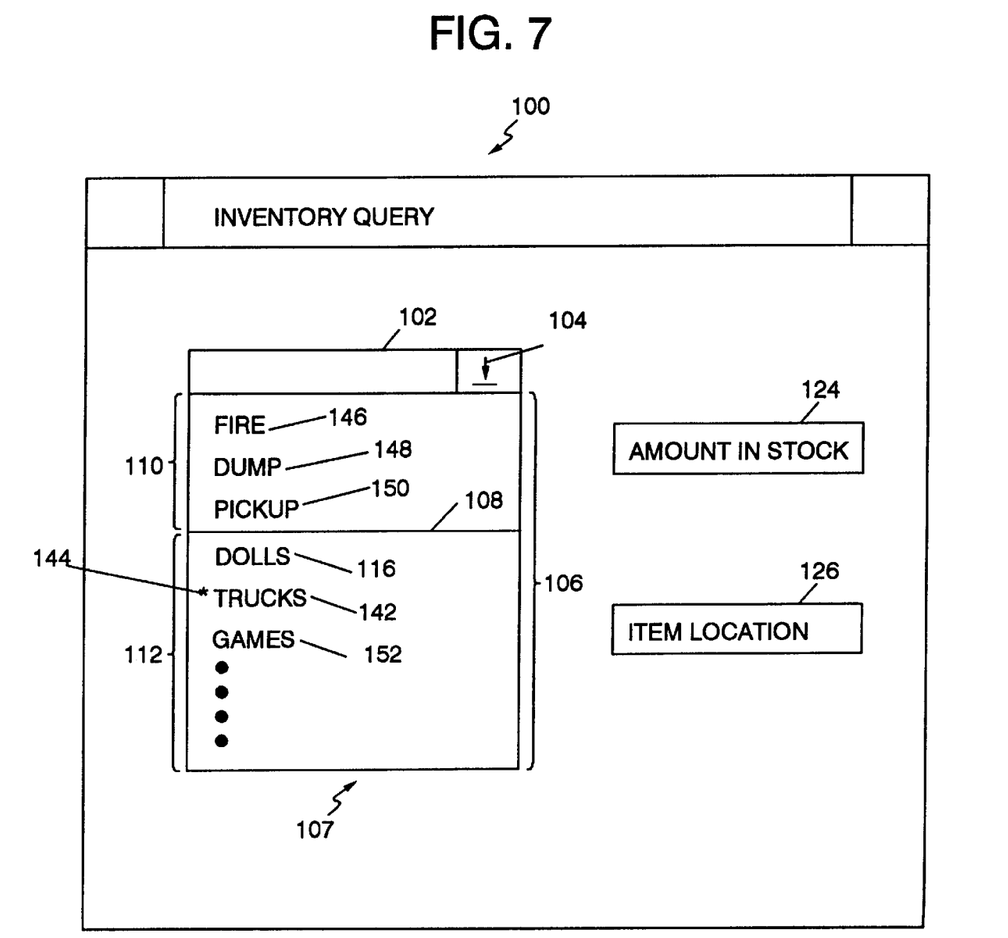

Referring to FIG. 7, the search for walking dolls completed, another inquiry has been received. Again the store clerk has activated the text box 102 by clicking on the arrow 104 with a mouse. This time, however, a category TRUCKS 142 has been selected as indicated by an asterisk 144. Therefore, the specific items of inventory, FIRE 146, DUMP 148 AND PICKUP 150, relating to the category of TRUCKS 142 appear in the section 110. The clerk may now select the specific item of inventory desired and complete the inquiry as detailed above. Similarly, if there is an inquiry for a specific type of game, the category GAMES 152 may be selected and the specific items of inventory therein will be listed in the section 110. Unlike the prior art, the drop down list 106 does not disappear from the screen upon selection of one of the plurality of categories in the section 112. Only upon selection of a specific item of inventory from the section 110 does the drop down list 106 disappear.

Figure 8:
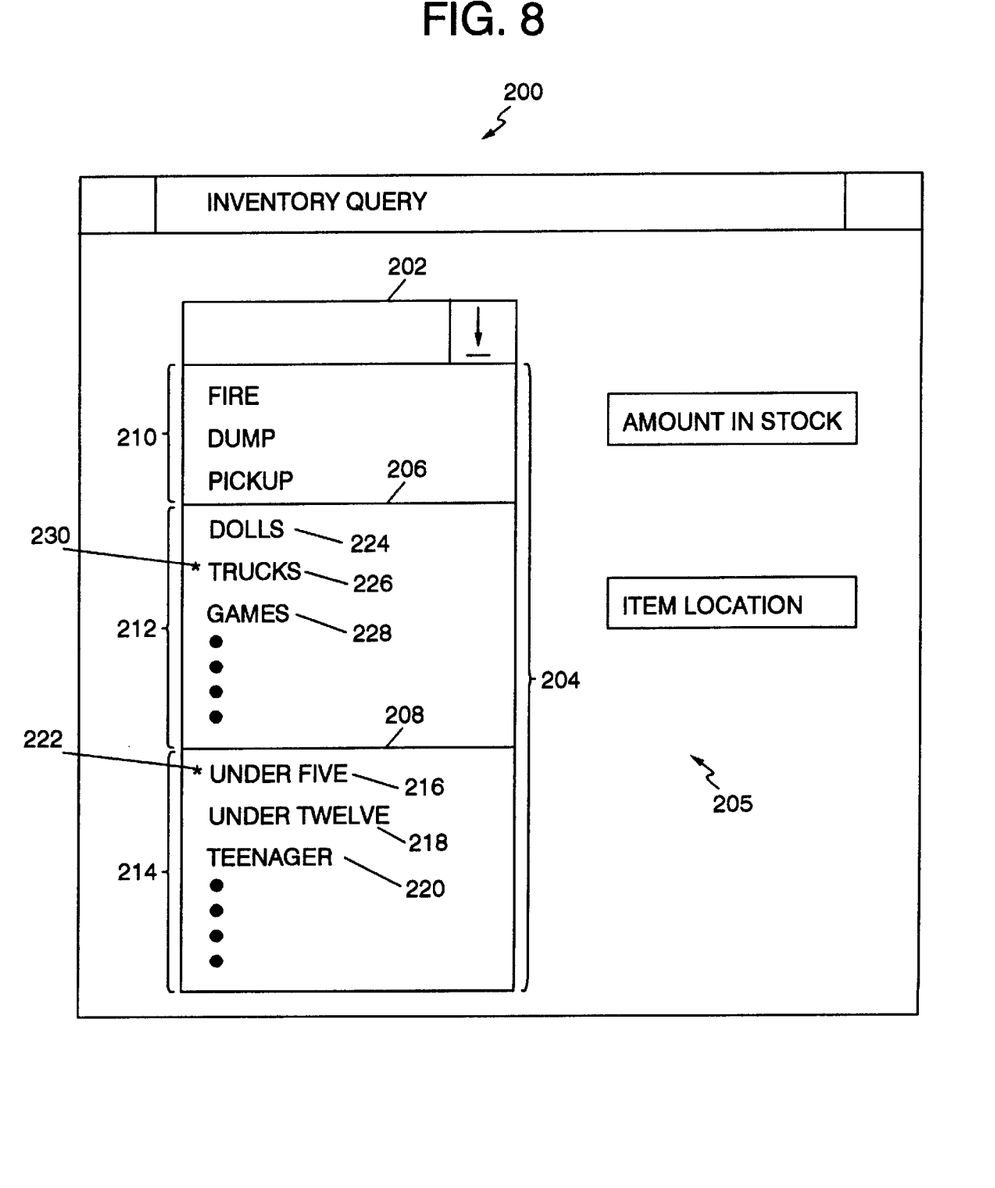
FIG. 8 illustrates a further embodiment of the present invention.

Referring to FIG. 8, a further embodiment of the present invention is illustrated. Since there is likely a great deal more to a toy store inventory (or any other similar listing) than shown in the example of FIGS. 3–7, the flexibility of the present invention will now be demonstrated. A screen 200 is depicted with a text box 202 and an activated drop down list 204 thereon, resulting in a drop down control 205. Now there is a first line 206 and a second line 208 dividing the list 204 into a specific item of inventory section 210, a sub-category section 212 and a category section 214. Thus it can be seen that there are at least three categories (UNDER FIVE 216, UNDER TWELVE 218 and TEENAGER 220) which comprise the main divisions of the types of toys found in the store.

Each of the main divisions of categories has at least one sub-category therein. For example, the category UNDER FIVE 216 (which has been selected, as indicated by an asterisk 222) has a plurality of sub-categories, DOLLS 224, TRUCKS 226 and GAMES 228. As previously described, the sub-categories (categories in the example of FIGS. 3–7) have at least one specific item of inventory therein. Since TRUCKS 226 has been selected (as shown by an asterisk 230), the specific items of inventory therein are listed in section 210. The remainder of the screen 200 is used as per the description above for FIGS. 3–7. Thus it can be seen that any number of items can be categorized and subdivided for simplification and ease of use due to the present invention.

Although the present invention has been described with respect to specific embodiments thereof, various changes and modifications may be suggested to one skilled in the art and it is intended that the present invention encourages such changes and modifications as fall within the scope of the appended claims.

We claim:

1. A screen space saving dynamic drop down control on a data processing system, comprising:

a drop down list text box with an activation mechanism, said drop down list text box comprising a data entry field;

a drop down list which appears upon selection of said activation mechanism, said list being divided into a plurality of sections;

a plurality of selectable categories appearing in a first section of said drop down list;

at least one specific selectable item appearing in a second section of said drop down list, said at least one item relating to a category selected in said first section;

at least one other specific selectable item appearing in said second section in a same physical space as and replacing said at least one specific item therein, said at least one other specific selectable item relating to a category selected in said first section; and means for entering a specific selectable item into said drop down list text box in order to perform further actions thereon.

2. The apparatus of claim 1, further comprising:

a plurality of sub-categories for further dividing said categories.

3. The apparatus of claim 1, further comprising:

means for hiding said drop down list upon selection of any one of said at least one specific selectable item but not upon selection of any one of said plurality of categories.

4. A method for dynamically selecting from a screen space saving drop down control on a data processing system, comprising the steps of:

activating a drop down list text box with an activation mechanism, said drop down list text box comprising a data entry field;

displaying a drop down list upon selection of said activation mechanism, said list being divided into a plurality of sections;

displaying a plurality of selectable categories in a first section of said drop down list;

displaying at least one specific selectable item in a second section of said drop down list, said at least one item relating to a category selected in said first section;

displaying at least one other specific selectable item appearing in said second section in a same physical space as and replacing said at least one specific item therein, said at least one other specific selectable item relating to a category selected in said first section; and entering a specific selectable item into said drop down list text box in order to perform further actions thereon.

5. The method of claim 4, further comprising the step of:

further dividing said categories into a plurality of sub-categories.

6. The method of claim 4, further comprising the step of:

hiding said drop down list upon selection of any one of said at least one specific selectable item but not upon selection of any one of said plurality of categories.

7. A computer program product recorded on computer readable media for a screen space saving dynamic drop down control on a data processing system, said product comprising:

computer readable means for activating a drop down list text box with an activation mechanism, said drop down list text box comprising a data entry field;

computer readable means for displaying a drop down list upon selection of said activation mechanism, said list being divided into a plurality of sections;

computer readable means for displaying a plurality of selectable categories in a first section of said drop down list;

computer readable means for displaying at least one specific selectable item in a second section of said drop down list, said at least one item relating to a category selected in said first section;

computer readable means for displaying at least one other specific selectable item appearing in said second section in a same physical space as and replacing said at least one specific item therein, said at least one other specific selectable item relating to a category selected in said first section; and computer readable means for entering a specific selectable item into said drop down list text box in order to perform further actions thereon.

8. The computer program product recorded on computer readable media of claim 7, further comprising:

means for further dividing said categories into a plurality of sub-categories.

9. The computer program product recorded on computer readable media of claim 7, further comprising:

means for hiding said drop down list upon selection of any one of said at least one specific selectable item but not upon selection of any one of said plurality of categories.

* * * * *